United States Patent [19]

De Coninck et al.

[11] Patent Number: 5,569,480

[45] Date of Patent: Oct. 29, 1996

[54] STARCH COMPOSITION

[75] Inventors: Valere L. M. P. De Coninck, Zelzate; Freddy M. L. van der Schueren, Aalst, both of Belgium

[73] Assignee: Cerestar Holding B.V., Sas van Gent, Netherlands

[21] Appl. No.: 413,406

[22] Filed: Mar. 30, 1995

[30] Foreign Application Priority Data

Apr. 5, 1994 [GB] United Kingdom ............... 9406639

[51] Int. Cl.$^6$ .................................................. A23L 1/0522
[52] U.S. Cl. ........................ 426/573; 426/574; 426/578
[58] Field of Search .................................. 426/573, 578, 426/576, 657, 654, 321

[56] References Cited

U.S. PATENT DOCUMENTS

| 3,870,527 | 3/1975 | Kryger et al. | 260/233.3 |
| 4,303,451 | 12/1981 | Seidel et al. | 426/578 |
| 4,592,919 | 6/1986 | Winters | 426/568 |
| 5,208,061 | 5/1993 | de Coninck | 426/573 |
| 5,320,854 | 6/1994 | Dave et al. | |

FOREIGN PATENT DOCUMENTS

| 109776 | 5/1984 | European Pat. Off. . |
| 30249764 | 12/1987 | European Pat. Off. . |
| 490557 | 6/1992 | European Pat. Off. . |
| 547551 | 6/1993 | European Pat. Off. . |

OTHER PUBLICATIONS

Kamsteeg, et al: "E=EETBAAR", 1986, p. 202.
Patent Abstracts of Japan, vol. 011, No. 106, (C-414) Apr. 3, 1987, & JP-A-61 254 602 Nov. 12, 1986.

*Primary Examiner*—Jeanette Hunter
*Attorney, Agent, or Firm*—Cushman Darby & Cushman, L.L.P.

[57] ABSTRACT

A composition which is suitable for use as a replacement for gum arabic in foodstuff applications, the replacement is a combination of hydroxypropylated starch and hydrolysed collagen.

14 Claims, No Drawings

STARCH COMPOSITION

The present invention relates to a starch containing composition and in particular to a composition which is suitable for use as a replacement for gum arabic in foodstuff applications.

Gum arabic is the dried exudate obtained from various species of trees of the genus Acacia of the Leguminosae family which are found in the tropical and semi-tropical areas of the world. The most important producing areas am the Republic of the Sudan and some of the countries in West Africa.

Gum arabic is extensively used, particularly in the food industry e.g. as the base for gum-containing confectionary products such as pastilles. In such applications gum arabic is difficult to replace and hence it is important that there should be a guarantee of supply of good quality product in sufficient quantity.

Unfortunately, the areas of the world from which gum arabic is obtained are subject to climatic and political uncertainties which can lead to reductions or interruptions in the supply of the product. There is therefore a considerable incentive to find a total or partial replacement for gum arabic in at least some of its applications.

In our U.S. Pat. No. 5,208,061 we have described and claimed a composition which is suitable for use as a replacement for gum arabic in certain applications, particularly in the production of gums and pastilles. The composition described in the U.S. patent comprises a mixture of an extruded waxy starch, a low DE maltodextrin and enzymatically hydrolysed collagen. The mixture may be agglomerated and preferably comprises 60 to 80% by weight of the composition extruded waxy starch, 12 to 25% maltodextrin, and 8 to 15% enzymatically hydrolysed collagen. In particular the composition may comprise 70 to 72% extruded waxy starch, 17 to 19% maltodextrin and 10 to 12% enzymatically hydrolysed collagen.

We have now found another starch-based composition which is effective as a gum arabic replacement and which consists of two components.

According to the present invention therefore a composition suitable for use as a replacement for gum arabic comprises a mixture of a thinned, hydroxypropyl tapioca starch and an enzymatically hydrolysed collagen.

Enzymatically hydrolysed collagen is a known commercial product obtained by the selective enzymatic hydrolysis of collagen and consists of a mixture of water soluble proteins of high average molecular weight.

The hydroxypropyl tapioca starch component of the composition according to the invention may have a DS (degree of substitution) in the range 0.05 to 0.2, preferably 0.08 to 0.15 particularly 0.1 to 0.12. It is also possible, although not necessary, for substitutents other than hydroxypropyl to be present in the starch molecule eg. acetate groups. The hydroxypropyl tapioca starch is "thinned" in order to reduce its viscosity in aqueous media. Thinning may be achieved in known manner by acid treatment, by enzyme treatment, or by extrusion, with or without the addition of acid. Suitably, the hydroxypropyl tapioca starch is thinned so that a 30% by weight aqueous mixture has a Brabender peak viscosity of about 150 Brabender Units. The thinned, hydroxypropyl tapioca starch may be ungelatinised as when acid thinned or gelatinised as when enzymatically thinned. In the latter case the thinned starch may be spray-dried.

The compositions according to the invention may contain 75.0 to 99.9% by weight of thinned, hydroxypropyl tapioca starch preferably 95.0 to 99.5% by weight and 0.1 to 25% by weight enzymatically hydrolysed collagen, preferably 0.5 to 5.0% by weight.

The composition according to the invention may be agglomerated. The agglomeration process increases the particle size of the composition and provides a more even particle size distribution so giving better dispersibility and a more homogeneous product. The agglomeration process is carried out in general by spraying the composition with a binding agent eg. an aqueous maltodextrin solution, while keeping the particles in a state of agitation. The agitation leads to the growth of the particles by random coalescence and by crushing and layering. Once the particles have reached the desired size, preferably 0.2 to 1.5 mm diameter, the moisture is evaporated by hot air. In order to produce the best product it is preferred that the amount of water in the agglomeration process is in the range 10 to 25% e.g. about 14% based on the weight of the composition and that the product be dried at an air temperature of 80° C. to 110° C. and product temperature of 40° C. to 60° C.

The composition according to the invention is of particular use as a replacement for gum arabic in the production of pastilles and gums. Such gums may be prepared by a process in which water (20 to 40% by weight of the mixture) is heated to about 70° C. and a composition according to the invention (20 to 60% by weight of the mixture) sucrose (10 to 30% by weight of the mixture) and glucose syrup (10 to 30% by weight of the mixture) are added. The mixture is then heated at a temperature of 118° C. for a few minutes, citric acid, flavour and colour being injected as desired. The mixture is finally run into starch moulds where it is allowed to solidify. This process provides a hard gum containing 20 to 35% by weight of the gum of sucrose, 20 to 35% by weight of the gum of glucose syrup, 25 to 50% by weight of the gum of a composition according to the invention and 6 to 20% by weight of the gum of water.

The advantage of use of the subject gum arabic replacer is illustrated for the use in salmiak containing gums.

The invention will now be further described with reference to the following Examples.

EXAMPLES

Example 1

A series of starch compositions was prepared containing the ingredients shown below. The starch was acid thinned, hydroxypropyl tapioca starch having a DS of 0.1 and a Brabender peak viscosity of 150 Brabender Units when measured as a 30% by weight aqueous mixture. The enzymatically hydrolysed collagen was the commercial product sold under the trademark SOLUGEL P.

The compositions were evaluated in comparison with gum arabic in a gum prepared using the method described earlier in this specification. The gum compositions and the results of the evaluation are presented in the following Table.

TABLE 1

| Composition % w/w | A | B | C | D | E | F | G |
|---|---|---|---|---|---|---|---|
| Gum arabic | 28 | | | | | | |
| H.P. tapioca starch | | 28 | 28 | 28 | 28 | 28 | 28 |

TABLE 1-continued

| Composition % w/w | A | B | C | D | E | F | G |
|---|---|---|---|---|---|---|---|
| SOLUGEL P | | | 1 | 2 | 5 | 7 | 10 |
| Sucrose | 20 | 20 | 20 | 19 | 17 | 16 | 15 |
| Glucose syrup | 17 | 17 | 16 | 16 | 15 | 14 | 12 |
| Lemon flavour | 0.2 | 0.2 | 0.2 | 0.2 | 0.2 | 0.2 | 0.2 |
| Citric acid solution (50% w/w) | 0.1 | 0.1 | 0.1 | 0.1 | 0.1 | 0.1 | 0.1 |
| Water | 34.5 | 34.5 | 34.5 | 34.5 | 34.5 | 34.5 | 34.5 |
| Colouring solution (10% w/w) | 0.2 | 0.2 | 0.2 | 0.2 | 0.2 | 0.2 | 0.2 |
| Cooking (open pan) | | | | | | | |
| temperature °C. | 118 | 118 | 118 | 118 | 118 | 118 | 118 |
| dry substance % w/w | 69 | 69 | 69 | 69 | 69 | 69 | 69 |
| Moulding viscosity mPas at 80° C. | 1384 | 1306 | 1310 | 1368 | 1470 | 1480 | 1610 |
| Drying 50 hours at 55° C. | | | | | | | |
| Gum texture | soft | very soft | soft | soft | hard | hard | very hard |
| Water content % w/w | 13.4 | | 13.1 | 12.9 | 13.2 | 13.6 | 13.1 |

Composition D approached the closest to the texture of the gum arabic formulation A but the other formulations had promise for producing gums with properties which, depending upon the type of product desired, could be attractive to confectionery manufacturers.

Example 2

The effect of NH$_4$Cl (Salmiak) on the viscosity of gum arabic based or acid thinned hydroxypropyl (ATHP) tapioca starch based gums was determined.

The acid-thinned hydroxypropyl tapioca starch had a DS of 0.1 and a Brabender peak viscosity of 150 Brabender units when measured as a 30% by weight aqueous mixture. NH$_4$Cl was added to 8 or 12% (w/w on commercial basis)

Comparison is between a solution containing 28% gum arabic and a solution containing 28% ATHP Starch +2% Solugel P.

Sucrose and glucose syrup were present as in Example 1 as were flavour and colouring. Cooking was performed in a jet cooker.

TABLE 2

Gum arabic with NH$_4$Cl

| Viscosity at 68° Brix and 65° C. | Addition of NH$_4$Cl (on c.b.) % | | |
|---|---|---|---|
| | 0 | 8 | 12 |
| after | | -% | -% |
| start | 992 | 690 (30) | 600 (40) |
| ½ h | 1472 | 712 (52) | 620 (58) |
| 1 h | 1792 | 848 (53) | 760 (58) |
| 3 h | 2120 | 1200 (43) | 1096 (49) |
| 4 h | 2140 | 1250 (42) | 1000 (53) |
| | | (44) | (52) (mean) |

TABLE 3

Acid-thinned hydroxypropyl tapioca starch + 2% Solugel P

| Viscosity at 68° Brix and 65° C. | Addition of NH$_4$Cl (on c.b.) % | | |
|---|---|---|---|
| | 0 | 8 | 12 |
| after | | -% | -% |
| start | 1272 | 1180 (7) | 908 (29) |
| ½ h | 1656 | 1260 (24) | 978 (41) |
| 1 h | 1952 | 1580 (19) | 1152 (41) |
| 3 h | 2136 | 1910 (11) | 1808 (16) |
| 4 h | 2152 | 1972 (8) | 1890 (12) |
| | | (14) | (28) (mean) |

From Tables 2 and 3 it can be concluded that
a) viscosity of gum arabic is highly influenced by NH$_4$Cl
b) viscosity of ATHP tapioca starch is much less affected.

ATHP tapioca starch is therefore a suitable gum arabic replacement in this application giving a product which is much more stable as regards its forms.

We claim:

1. A composition suitable for use as a replacement for gum arabic, said composition comprising a mixture of
   75.0 to 99.9% by weight of a thinned, hydroxypropyl tapioca starch and
   25 to 0.1% by weight of enzymatically hydrolysed collagen.

2. A composition according to claim 1 which has been agglomerated.

3. A composition according to claim 2 wherein the thinned, hydroxypropyl tapioca starch is acid thinned.

4. A composition according to claim 1 or 2 which comprises
   95.0 to 99.5% by weight of the composition of thinned, hydroxypropyl tapioca starch, and
   5 to 0.5% by weight of the composition of enzymatically hydrolysed collagen.

5. A composition according to claim 1 wherein the thinned, hydroxypropyl tapioca starch is acid thinned.

6. A composition according to claim 1 wherein the thinned hydroxypropyl tapioca starch has a DS of 0.05 to 0.2, preferably 0.08 to 0.15, particularly 0.1 to 0.12.

7. A composition according to claim 1 wherein a 30% by weight aqueous solution of the thinned, hydroxypropyl tapioca starch has a Brabender viscosity of about 150 Brabender Units.

8. A composition according to claim 2 wherein the composition is agglomerated in the presence of water.

9. A composition according to claim 2, 5, 6, 7 or 8 wherein the particle size of the agglomerated composition lies in the range 0.2 to 1.5 mm.

10. A confectionery hard gum comprising 20 to 35% by weight of the gum of sucrose, 20 to 35% by weight of the gum of a glucose syrup, 25 to 50% by weight of the gum of a composition according to any one of claims 1, 2, 5, 6, 7 or 8, 6 to 20% by weight of the gum of water and, optionally, citric acid, flavour and/or colour to taste.

11. A confectionery gum comprising from 1 to 12% w/w of $NH_4Cl$ in combination with acid-thinned hydroxypropyl tapioca starch.

12. A composition according to claim 3 wherein the thinned hydroxypropyl tapioca starch has a DS of 0.05 to 0.2, preferably 0.08 to 0.15, particularly 0.1 to 0.12.

13. A composition according to claim 12 wherein a 30% by weight aqueous solution of the thinned, hydroxypropyl tapioca starch has a Brabender viscosity of about 150 Brabender Units.

14. A composition according to claim 13 wherein the composition is agglomerated in the presence of water.

* * * * *